Jan. 14, 1964   C. A. GLENN ETAL   3,117,792
FUSIBLE SHAFT SEAL
Original Filed June 6, 1961

INVENTORS
CHARLES A. GLENN
TRENT H. HOLMES
BY Charles A. Warren
ATTORNEY 3,117,792
FUSIBLE SHAFT SEAL
Charles A. Glenn, West Hartford, and Trent H. Holmes, Rocky Hill, Conn., assignors to United Aircraft Corporation, East Hartford, Conn., a corporation of Delaware
Continuation of application Ser. No. 115,226, June 6, 1961. This application June 10, 1963, Ser. No. 287,741
8 Claims. (Cl. 277—22)

This is a continuation of applicants' co-pending application Serial No. 115,226, filed June 6, 1961, and now abandoned.

This invention relates to a fusible shaft seal to prevent leakage along the shaft when the shaft is at rest.

One feature of the invention is an arrangement for introducing a sealing material into contact with the shaft, the material being solidified and bonded by contact with the shaft. Another feature is an arrangement for heating the sealing material so that it will flow into contact with the shaft. Another feature is an arrangement for pressurizing the sealing material to cause it to flow into sealing position. Another feature is an arrangement by which to withdraw the material from shaft seal position in preparation for rotation of the shaft.

One particular feature is a fusible seal for a pump for use in preventing leakage of a cryogenic fluid along a pump shaft when the pump is not rotating. Another feature is the use of a material for sealing which is a solid at the temperature of the fluid being pumped.

Other features and advantages will be apparent from the specification and claims, and from the accompanying drawing which illustrates an embodiment of the invention.

Figure 1:
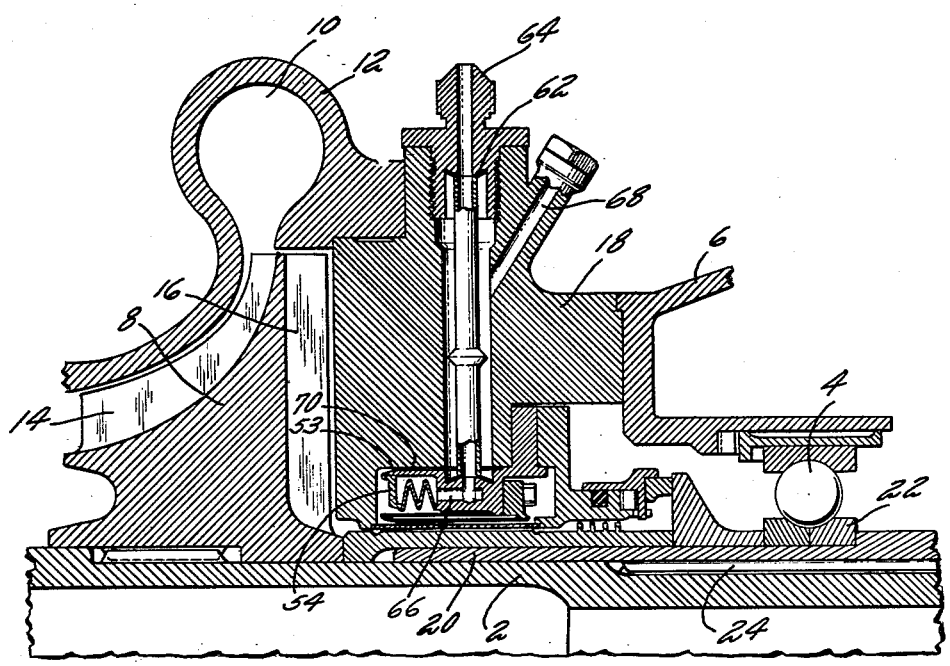
FIG. 1 is a fragmentary sectional view of the seal embodying the invention.
Figure 2:
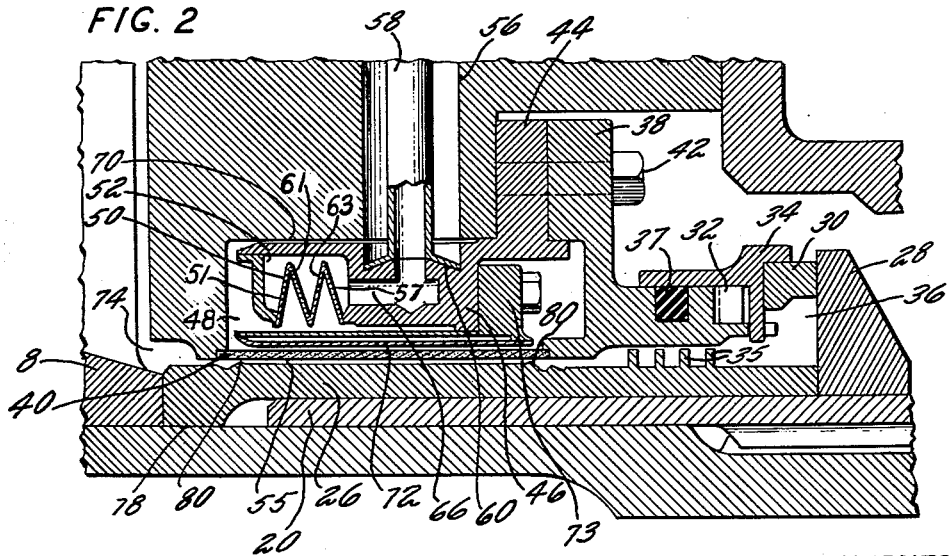
FIG. 2 is a view of a portion of FIG. 1 on a larger scale showing the seal structure in greater detail.

Referring first to FIG. 1, a shaft 2 is supported by a bearing 4 in a housing 6. The shaft carries a pump rotor 8 which pumps fluid into a discharge volute 10 in a pump casing 12. The pump rotor has the usual pumping vanes 14 and the backside of the rotor carries pressure balancing vanes 16. The housing 6 is attached to one side of a ring element 18 which surrounds the seal and to the other side of which the pump casing is also attached. The housing 6, ring element 18 and casing 12 form a stationary housing for the pump shaft and seal.

The shaft 2 has mounted thereon a sleeve 20 on which the inner race 22 for the bearing 4 is mounted. The sleeve 20 is preferably splined as at 24 to the shaft. The sleeve 20 is surrounded by a second sleeve 26 also rotating with the shaft and clamped between the rotor 8 for the pump and a seal ring 28 adjacent to the inner race 22. Some regions of sleeve 26 are coated with insulating material 78. The sleeve 26 and sleeve 20 are in effect parts of the rotating shaft.

A nonrotating carbon seal ring 30 is held against the seal ring 28 by a wave spring 32, the latter acting against a backing ring 34 for the carbon seal 30. A labyrinth seal 35 on the sleeve 26 adjacent the carbon seal restricts the flow of pumped fluid into space 36 between the seal 35 and the carbon seal 30 thus increasing the effectiveness of the seal 30. An additional sealing ring 37 carried by a support bracket 38 is in a position to engage the backing ring 34 to prevent leakage at this point. The combination of labryinth seal 35, carbon seal 30 and sealing ring 37 constitute a sealing arrangement to prevent pumped fluid leakage along the shaft when the shaft is rotating.

In closely spaced relation to the outer surface of the sleeve 26 is a porous cylinder 40 supported between a part of the ring element 18 and the bracket 38, the latter being clamped to the ring element 18 as by bolts 42, these bolts also clamping a flange 44 on a carrier ring 46. The sleeve 40, ring element 18 and bracket 38 define a chamber 48 surrounding the sleeve 40 and this chamber is filled with a material which normally is solid at the temperature of the fluid being pumped. Thus, if the fluid being pumped is liquid hydrogen, the material in the chamber 48 might, for example, be mercury.

The carrier ring 46 is positioned within the chamber 48 and has mounted thereon an annularly arranged bellows 50 defining externally thereof a small chamber 52, the other chamber walls being a flange 53 on ring 46 and an end cap 54 attached to the flange and to the bellows. By forcing fluid under pressure into the small chamber 52, the material in the chamber 48, if fluid, can be forced through the porous cylinder 40 and into the clearance space 55 between the porous cylinder and sleeve 26.

To deliver fluid under pressure to the chamber 52, the ring element 18 has a radial passage 56 therein in which is positioned a tube 58, the opposite ends of which are flared to engage with a seating surface 60 on the carrier ring 46 and a seating surface 62 on cap 64 which serves to close the end of the radial passage 56. The cap 64 has a bore therein through which fluid under pressure can be admitted to the tube 58 and thence through a passage 66 in the carrier ring into the chamber 52. The chamber 48 may be filled with the sealing material, when fluid, through an oblique filling passage 68 communicating with the passage 56 externally of the tube 58 and with a cylindrical clearance space 70 externally of the carrier ring 46 and flange 53.

A heating element 72 preferably of annular construction is arranged within the chamber 48 in closely surrounding relation to the porous cylinder 40 thereby providing for heating the sealing material so that it may be liquified in readiness for use. The heating element may be carried by a mounting ring 73 bolted to carrier ring 46. The heating element, for example, may be an electrical element with suitable leads, not shown, connected to an external source of power through a passage comparable to the passage 66 and tube 58.

In operation, when the pump is about to be shut down so that the shaft 2 is stopped, heat is applied to the element 72 so that the sealing material is liquified. Then when shaft 2 is stopped, pressure is applied to the chamber 52 to act upon bellows 50. Since bellows 50 comprises a series of convolutions, 51, 61, 63, and 57, which are in effect conical discs joined together so that each acts individually as a beam would act, the pressure of fluid within chamber 52 causes bellows 50 to distort so that ring convolutions 51 and 61 and ring convolutions 63 and 57 are forced into contact. This action of beam-like convolutions 51, 61, 63, and 57 is described in greater particularity in the text "Formulas for Stress and Strain" by Roark, third edition, published by McGraw-Hill Book Company, Inc. This action of bellows 50 increases the volume in chamber 52 but decreases the volume in chamber 48, external of chamber 52. This change in volume of chamber 48 forces the liquid sealing fluid through the porous cylinder 40 and into the clearance space 55 where it is immediately solidified by contact with the colder pump fluid and the cold sleeve 26, the sleeve being colder than the solidifying temperature of the sealing material. The heat to element 72 and pressure to chamber 52 are then cut off. It will be understood that the fluid being pumped will, when the pump is stopped, tend to flow past the back side of the pump rotor into the chamber 74 which surrounds the shaft adjacent to the rotor and flow through the clearance space 55 to escape past the labyrinth seal 35 and carbon seal 30. The dimensions of the clearance space 55 may be so selected, in conjunction with the surface tension of the liquid sealing material, as to prevent flow of the pumped fluid through the clearance space.

The sleeve 26 may be insulated from the rotor 8, shaft 2 and sleeve 20 by an insulating coating 78. With this arrangement, the continued heating of the sealing fluid by element 72 and the controlled loss of heat from sleeve 26 by the insulation permits the sealing material to fill clearance space 55 while fluid, to wet and bond to sleeve 26 and thus produce a leak-tight seal between sleeve 26 and porous cylinder 40 when the heating element 72 is shut down.

Whenever the pump is to be started, the leak-tight seal must be broken. To do this the heating unit 72 is again energized, pressure within the chamber 52 having previously been relieved. As the sealing fluid liquifies, the bellows 50 returns to its original shape due to its inherent flexibility and resiliency and the sealing fluid is drawn back into the chamber 48 through the porous cylinder to prevent the formation of a vacuum between the convolution rings 51—61 and 63—57. As the pump shaft begins to rotate any sealing material adhering to sleeve 26 is returned to the surface of cylinder 40 by centrifugal force aided by slingers 80 on the sleeve 26. During pump operation, the carbon seal 30 is operative to control leakage. After the pump is in operation, heating is discontinued until the next pump shutdown.

It is to be understood that the invention is not limited to the specific embodiment herein illustrated and described, but may be used in other ways without departure from its spirit as defined by the following claims.

We claim:

1. In combination, a movable shaft, a fusible shaft seal to prevent leakage along said shaft when said shaft is at rest comprising a first annular chamber surrounding said shaft, flexible means located within said first annular chamber and defining a wall of a second chamber, a porous sleeve surrounding said shaft separating said first annular chamber from said shaft and forming an annular space with said shaft, means to introduce a selected fusible sealant into said first annular chamber which will be solid at shaft operating temperature, means in said first chamber to heat said sealant to the fluid state, and means to introduce pressurizing fluid into said second chamber to cause the flexible means therein to be moved and hence reduce the volume of said first annular chamber to thereby force said liquid sealant through said porous sleeve and against said shaft for fusion therewith when said shaft is at rest and when said heating means is inoperative.

2. Apparatus according to claim 1 and including means responsive to movement of said shaft to cause said fluid sealant to return from said annular space to said first annular chamber.

3. Apparatus according to claim 1 wherein said flexible means includes a bellows.

4. Apparatus according to claim 3 wherein said bellows distorts in response to pressure within said second chamber.

5. Apparatus according to claim 4 wherein said removal of pressure from said second chamber will permit said bellows to return to its normal position and thereby draw the liquid sealant from said shaft and into said annular chamber.

6. A seal including a housing, a movable shaft in said housing, the latter having a cylindrical portion in closely spaced relation to said shaft, an annular chamber within said housing and surrounding said shaft adjacent to the cylindrical portion, a sealant material which is solid at shaft operating temperature filling said chamber, means in said chamber to liquify said sealant material, and means to vary the volume of said chamber to force said liquefied sealant against said shaft to fuse thereagainst when said shaft is at rest and said liquifying means is inoperative.

7. Apparatus according to claim 6 wherein said volume varying means includes a bellows which distorts in shape in response to pressure external of said annular chamber to reduce the volume thereof and, hence, force said liquefied sealant against said shaft, and which bellows returns to its normal position when said external pressure is relieved and thereby increases the volume of said annular chamber and draws said liquefied sealant thereinto.

8. Apparatus according to claim 7 and including centrifugal slingers positioned for rotation with said shaft and operative in response to rotation thereof to assist said bellows in returning said liquefied sealant through said annular chamber.

References Cited in the file of this patent

UNITED STATES PATENTS

| | | |
|---|---|---|
| 2,448,717 | Jeffcock | Sept. 7, 1948 |
| 2,646,065 | Tyson | July 21, 1953 |
| 3,001,806 | Macks | Sept. 26, 1961 |